April 3, 1951     A. F. GREEN     2,547,459
CARRIER

Filed Aug. 26, 1947     2 Sheets-Sheet 1

Inventor
Abram Franklin Green

By Clarence A. O'Brien
and Harvey B. Jacobson
Attorneys

April 3, 1951  A. F. GREEN  2,547,459
CARRIER
Filed Aug. 26, 1947  2 Sheets-Sheet 2

Inventor

Abram Franklin Green

By *Clarence A. O'Brien and Harvey B. Jacobson*
Attorneys

Patented Apr. 3, 1951

2,547,459

UNITED STATES PATENT OFFICE 2,547,459

CARRIER

Abram Franklin Green, St. Petersburg, Fla.

Application August 26, 1947, Serial No. 770,644

3 Claims. (Cl. 224—48)

This invention relates to carriers for food and the like.

The object of the invention is to provide a carrier for food, medicine, surgical instruments and other articles and supplies, which can easily be carried by hand from place to place and which is normally covered to protect the contents but may be manually opened to permit removal of the contents without relinquishing the carrier.

A further object of the invention is to provide such a carrier which may be opened by the same hand by which it is carried leaving the other hand free to remove the contents.

A further object of the invention is to provide mechanical means for opening the cover, actuated by a comparatively slight manual or digital movement.

The objects of the invention are attained by means of a receptacle having a handle and a hinged cover, normally closed, which may be swung open by manual or digital actuation of a reciprocable actuating pin having a toggle connection between the cover and the pin.

The invention is hereinafter more particularly described and illustrated by way of example in the accompanying drawings in which.

Corresponding numerals in the different figures refer to corresponding parts.

Figure 1:
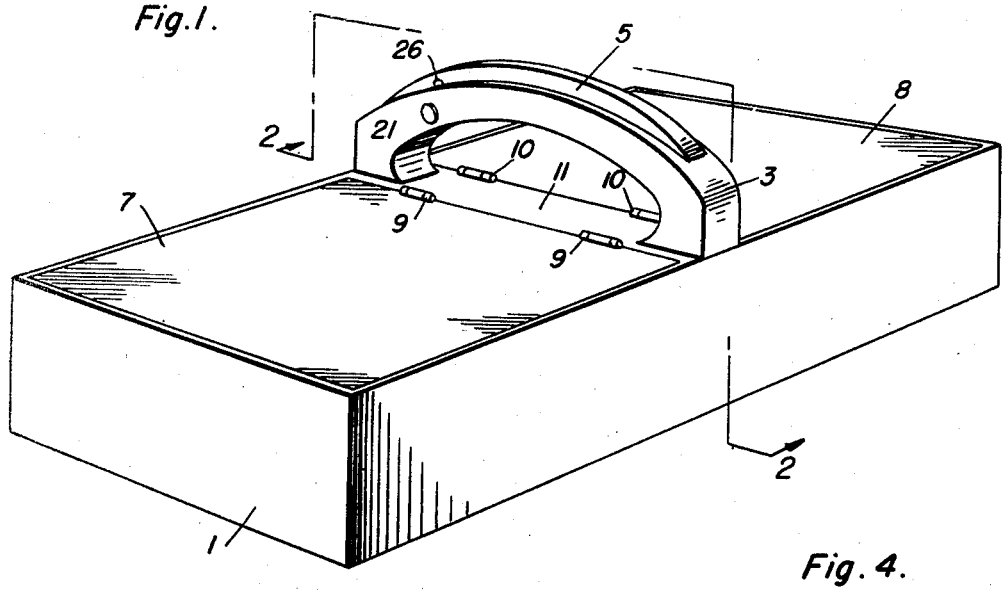
Figure 1 is a perspective view of the carrier.
Figure 4:
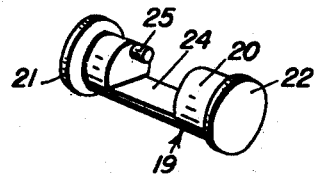
Figure 4 is a perspective view of the lever locking device.
Figure 2:
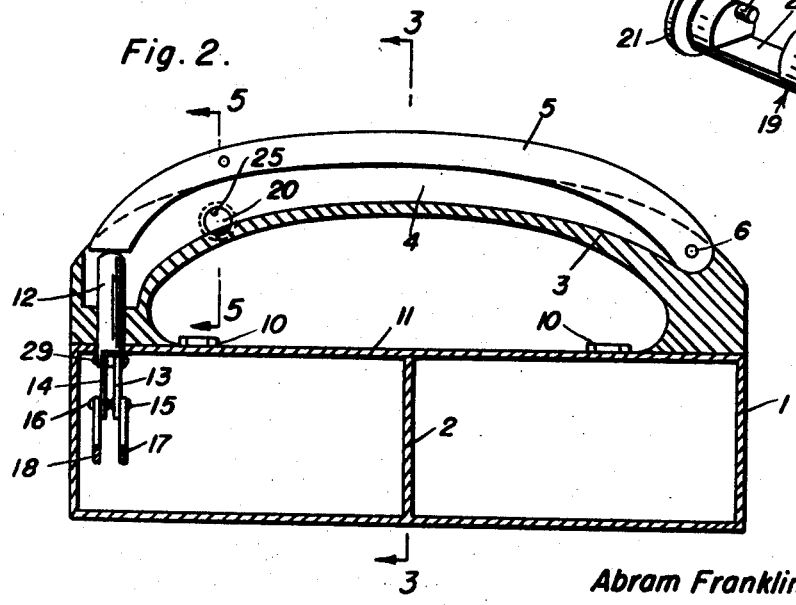
Figure 2 is a cross section on the line 2—2 in Figure 1.

The carrier comprises a substantially rectangular receptacle 1 having a transverse partition 2 for dividing the interior into two compartments. A transversely extending arcuate handle 3 is fixed centrally of the receptacle 1, and is provided with a longitudinal channel 4 in its upper side to receive an arcuate lever 5 pivoted at one end in said channel 4 by means of pivot pin 6.

A pair of covers 7 and 8 are hinged at one of their sides adjacent the handle by means of hinges 9 and 10 to a central transverse strip 11 which extends from side to side of the receptacle beneath the handle 3. The covers serve to close the opposite ends of the receptacle 1 and when swung to elevated position access is provided to the interior of the receptacle.

An actuating rod or pin 12 is slidably mounted in the carrier through one end of the handle 3 and through the strip 11 of the receptacle 1 for vertical movement. The lower end of the pin is bifurcated and a pair of depending toggle links 13 and 14 are pivotally mounted on the bifurcated end of the pin by means of a pin 29 which passes through the arms of the bifurcated end of pin 12 and through holes in the ends of the links 13 and 14 whereby the links may pivot longitudinally of the receptacle but are restrained from sideways movement.

Toggle links 13 and 14 are in turn pivotally connected by pins 15 and 16 to the free ends of the semi-circular or arcuate arms 17 and 18 which are fixed at their opposite ends to the undersides of the said covers 7 and 8. The toggle links 13 and 14 are located within the receptacle. When the covers are closed each toggle link extends at an angle to the central axis of the pin away from the hinged edges of the cover to which it is linked, i. e. as shown in Figure 3 the toggle link and arcuate arm for operating one cover cross the toggle link and arcuate arm for the other cover.

Figure 3:
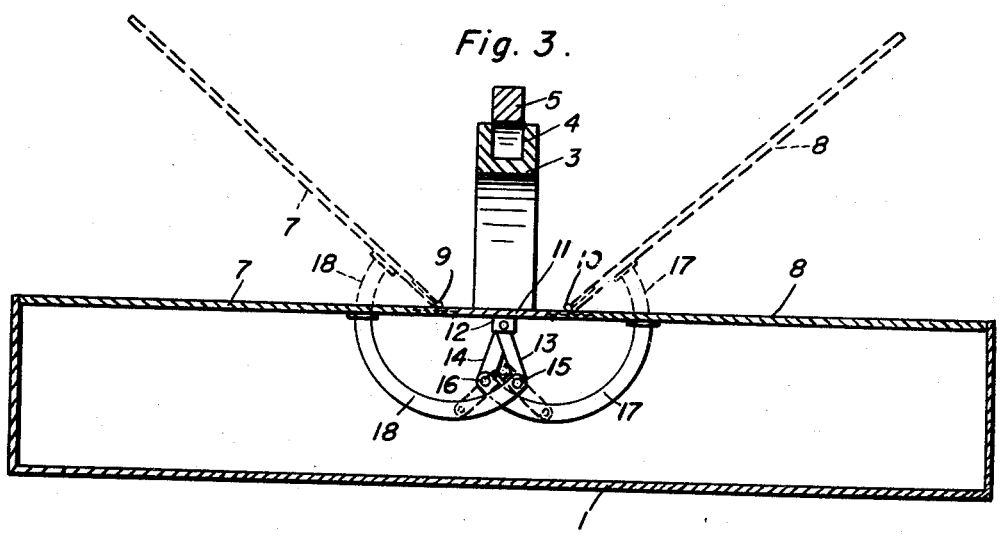
Figure 3 is a longitudinal section on the line 3—3 in Figure 2 with the covers shown in closed position in full lines and in open position in dotted lines.

The lever 5 can be depressed by squeezing it with the hand which is holding the handle, causing the free end of the lever to bear down on the pin 12, forcing the pin downwardly, and causing the linkage including the toggle links 13 and 14 and the arms 17 and 18 connected therewith to impart a lifting force to the hinged covers to swing them to open position shown in dotted lines in Figure 3.

As the pin 12 is pushed down or depressed the links swing into and past the longitudinal center line of the pin 12 as shown in Figure 3. By this arrangement a slight downward movement of the pin results in a comparatively large lifting movement of the covers.

A latch, generally designated by the reference numeral 19 is mounted transversely through the channel 4 in the handle 3, and comprises a cylindrical body 20 having a fixed head 21 on one end and a removable head 22 threaded at 23 to its opposite end. The body 20 is provided with a notch 24 to receive lever 5 when it is fully depressed, and a longitudinally extending pin 25 projects into the notch 24 and is adapted to enter opening 26 formed through lever 5. The spacing of the heads 21 and 22 is such that transverse sliding movement of the body member 20 in the handle is permitted. When the body member is moved transversely of the handle in one direction the pin 25 will enter opening 26 if the lever 5 is in depressed position, thus locking it in that position and thereby retaining the covers 7 and 8 in raised or elevated position. Obviously movement of the member 20 in the opposite direction will remove the pin 25 from the opening 26 and release the lever. The weight of the covers 7 and 8 will cause them to drop to closed position raising the pin 12 and lever 5.

Figure 6:
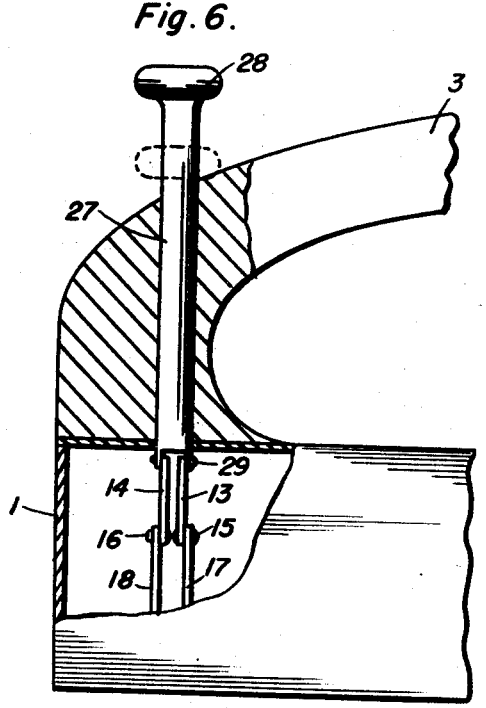
Figure 6 is a side elevation on an enlarged scale partly broken away and in section of one side of the carrier showing a modified form of cover raising means.
Figure 5:
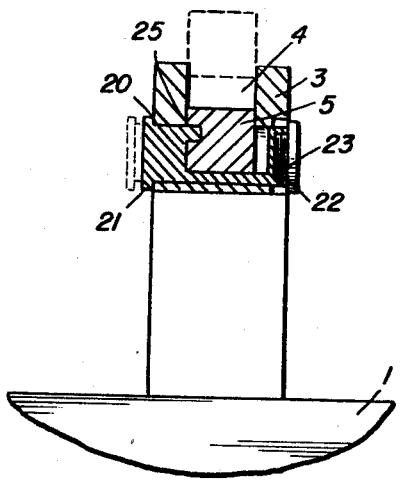
Figure 5 is a fragmentary cross section through the handle on the line 5—5 in Figure 2.

In Figure 6 of the drawings a modified construction is shown in which the actuating lever and channel in the handle is omitted. An actuating pin 27 in all respects the same as the actuating pin 12 is shown except that it extends above the handle and is provided with a head 28 on its upper end. Head 28 can be engaged by a finger of the hand which is holding the handle and depressed to open the covers by means of toggle links 13 and 14 and interconnected arcuate arms 17 and 18.

It will be seen from the above description that the apparatus described satisfactorily achieves the objects of my invention. The carrier can be used for carrying any article or liquid which it is desired to protect from heat, cold, dust, insects or germs.

The word "carrier" is used in a broad sense as including any receptacle or container having a handle whereby it may be carried and would include cooking utensils, kettles, tea pots, waste receptacles, candy boxes, sterilizing units, and lunch boxes. It may be used for carrying picnic lunches; for dispensing weiners, hamburgers, sandwiches, etc.; for carrying medicines or surgical instruments in hospitals; and for many other purposes.

The carrier may be made of any suitable material such as wood, metal or a suitable plastic or a combination thereof. All or part of the receptacle or cover may be made transparent to display the contents of the carrier.

While two covers have been shown and described as the preferred embodiment of the invention it is obvious that one cover only may be provided if desired, necessitating only one toggle link and arcuate arm. Other modifications of the construction may be made without departing from the spirit of the invention.

Having described the invention what is claimed as new is:

1. A carrier comprising a receptacle having an open top section, a transversely disposed handle mounted on the top section and extending upwardly therefrom, a channel formed in the upper face of the handle, a lever pivotally mounted at one end in said channel and having a free end swingably disposed in the channel, a vertically reciprocable actuating pin extending through said handle and engageable with the free end of the lever, covers hinged at one end to said receptacle adjacent said handle, toggle links pivotally carried by said actuating pin, arcuate arms connected to said toggle links and said cover for swinging the same upwardly from the top section upon depression of the lever, means disposed in the handle and selectively engageable transversely with the free end of the lever for locking the lever in a depressed position, whereby the covers are held in an open position said locking means including a member slidably disposed in said handle and having a cut-out portion for accommodating the free end of the lever, said lever being formed with a transverse opening, and said member having a locking pin selectively engageable in the opening in said lever.

2. A carrier including a receptacle having a bottom wall, opposed side and end walls and an open top section, a strip disposed transversely between the upper edges of the side walls, a handle mounted at its opposing ends on said strip and spaced vertically therefrom, covers for said top section hingedly secured at one of their ends to the opposing edges of the strip and adapted for vertical swinging movement relative to the top section and end walls, a channel formed in the upper face of the handle, a lever pivotally disposed in said channel, a vertically reciprocable actuating pin disposed through said handle and having a free upper end disposed vertically in the channel and engageable with the lever, toggle links pivotally carried by the lower end of said pin, arms connected between said toggle links and the under face of the covers for swinging the covers upwardly from the top section upon depression of the lever, means slidably disposed transversely in the handle and engageable with the lever for locking the same in a depressed position said last means including a member slidably disposed transversely in the handle and through the channel and formed with a cut-out portion for seating the lever, said lever being formed with a transverse opening and said member having a locking tongue engageable in said opening upon sliding movement of the member.

3. The combination of claim 2, wherein said tongue transversely overlies said cut-out portion.

ABRAM FRANKLIN GREEN.

REFERENCES CITED

The following references are of record in the file of this patent:

UNITED STATES PATENTS

| Number | Name | Date |
|---|---|---|
| 308,634 | Seinecke | Dec. 2, 1884 |
| 1,083,716 | Weber | Jan. 6, 1914 |
| 1,103,225 | Schindeler | July 14, 1914 |
| 1,804,163 | Herold | May 5, 1931 |
| 1,921,933 | Levenberg et al. | Aug. 8, 1933 |
| 2,027,537 | Krichner | Jan. 14, 1936 |
| 2,186,795 | Anderson | Jan. 9, 1940 |
| 2,430,222 | Goldbert | Nov. 4, 1947 |

FOREIGN PATENTS

| Number | Country | Date |
|---|---|---|
| 214,868 | Great Britain | May 1, 1924 |
| 429,065 | Great Britain | May 23, 1935 |